US008856750B2

(12) United States Patent
Bellamy et al.

(10) Patent No.: US 8,856,750 B2
(45) Date of Patent: Oct. 7, 2014

(54) TASK-BASED EVALUATION OF USER INTERFACES

(75) Inventors: Rachel K. E. Bellamy, Bedford, NY (US); Bonnie E. John, Pittsburgh, PA (US); Calvin B. Swart, Poughkeepsie, NY (US); John C. Thomas, Jr., Yorktown Heights, NY (US); Sharon M. Trewin, Croton-On-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 12/892,452

(22) Filed: Sep. 28, 2010

(65) Prior Publication Data

US 2012/0079453 A1    Mar. 29, 2012

(51) Int. Cl.
*G06F 9/44*    (2006.01)
*G06F 9/45*    (2006.01)

(52) U.S. Cl.
CPC ... *G06F 8/77* (2013.01); *G06F 8/51* (2013.01)
USPC ............ 717/126; 717/131; 717/136; 715/249

(58) Field of Classification Search
USPC ......................................................... 717/126
See application file for complete search history.

(56) References Cited

U.S. PATENT DOCUMENTS

| 5,724,262 | A | 3/1998 | Ghahramani |
| 7,464,010 | B2 | 12/2008 | Yang et al. |
| 7,673,287 | B2 | 3/2010 | Mayer-Ullmann et al. |
| 2003/0135508 | A1* | 7/2003 | Chorafakis et al. ........... 707/100 |
| 2006/0005079 | A1* | 1/2006 | Kaplan et al. ................... 714/38 |
| 2006/0293875 | A1* | 12/2006 | Stanfill et al. ..................... 704/2 |
| 2009/0133000 | A1* | 5/2009 | Sweis et al. ..................... 717/124 |

OTHER PUBLICATIONS

Kieras, "Using the Keystroke-Level Model to Estimate Execution Times", archived May 26, 2000 at http://web.archive.org/web/20000526172020/http://www.pitt.edu/~cmlewis/KSM.pdf, Accessed online on Aug. 24, 2013.*
Fabio Paternò, Carmen Santoro, A unified method for designing interactive systems adaptable to mobile and stationary platforms, Interacting with Computers, vol. 15, Issue 3, Jun. 2003, pp. 349-366, ISSN 0953-5438.*
Bryne, M., et al. "Automating Interface Evaluation" Conference on Human Factors in Computing Systems, CHI 1994. Apr. 1994. pp. 232-237.
Contini, E., et al. "A Semi-Automatic Support to Adapt E-Documents in an Accessible and Usable Format for Vision Impaired Users" Computers Helping People with Special Needs, 11th International Conference, ICCHP 2008. Jul. 2008. pp. 242-249.
John, B. "COGTOOL: Predictive Human Performance Modeling by Demonstration" Proceedings of the 19th Conference on Behavior Representation in Modeling and Simulation. Mar. 2010. (2 Pages).
John, B., et al. "Predictive Human Performance Modeling Made Easy" Proceedings of the 2004 Conference on Human Factors in Computing Systems, CHI 2004. vol. 6, No. 1. Apr. 2004. pp. 455-462.

* cited by examiner

*Primary Examiner* — James D Rutten
(74) *Attorney, Agent, or Firm* — Tutunjian & Bitetto, P.C.; Louis Percello

(57) ABSTRACT

A system and method for evaluating interfaces includes computing a reference script for a task from a reference interface design and translating the reference script into one or more target action scripts based on a target design. The one or more target action scripts on the target design are executed to produce target metrics. The target metrics are compared to determine whether the target action script successfully translates the reference script.

23 Claims, 8 Drawing Sheets

TASK-BASED EVALUATION OF USER INTERFACES

BACKGROUND

1. Technical Field

The present invention relates to user interface evaluation and more particularly to systems and methods for comparing user interfaces to determine equivalent functionality.

2. Description of the Related Art

User interface designers work most comfortably with a single, concrete design, but applications are increasingly being delivered in multiple forms. For example, a desktop application may also be accessed on a mobile device, through the telephone, or through an assistive technology such as a screen reader used by people with visual impairment. Each of these access modes requires an alternate form of the user interface. It is expensive and time consuming to explicitly design multiple versions of an interface.

One solution is to use model-based design. In this case, a designer creates an abstract representation of the application's functionality and user interface, which is mapped to different concrete presentations. These concrete presentations can then be evaluated using human performance models to provide comparative metrics. However, this approach requires the designer to explicitly demonstrate the tasks of interest on each different design. Effectively, the designer is working with multiple user interfaces simultaneously, which is difficult.

Another solution is to build one interface and have it automatically or semi-automatically transformed to produce an alternate interface. Screen reader access operates in this way, interpreting a visual user interface into an auditory form that a blind user can interact with (e.g., JAWS™ Screen Reader by Freedom Scientific). However, design decisions made to improve usability of the visual interface may harm the usability in other access modes.

Designers who are unfamiliar with these modes need a way to understand the consequences of their design decisions for alternative user interfaces, without having to be experts in all possible alternative presentation modes (such as screen reader usage).

SUMMARY

A system and method for evaluating interfaces includes computing a reference script for a task from a reference interface design and translating the reference script into one or more target action scripts based on a target design. The one or more target action scripts on the target design are executed to produce target metrics. The target metrics are compared to determine whether the target action script successfully translates the reference script.

A system for evaluating interfaces includes a processor and a memory coupled to the processor. The memory includes an interface evaluation tool configured to determine whether a reference design on a first platform has an equivalent target design on a second platform such that the target design can perform a same task as the reference design. The tool is configured to compute a reference script for a task from a reference interface design; translate the reference script into one or more target action scripts based on a target design; execute the one or more target action scripts on the target design to produce target metrics; and compare the target metrics to determine whether the target action script successfully translates the reference script.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
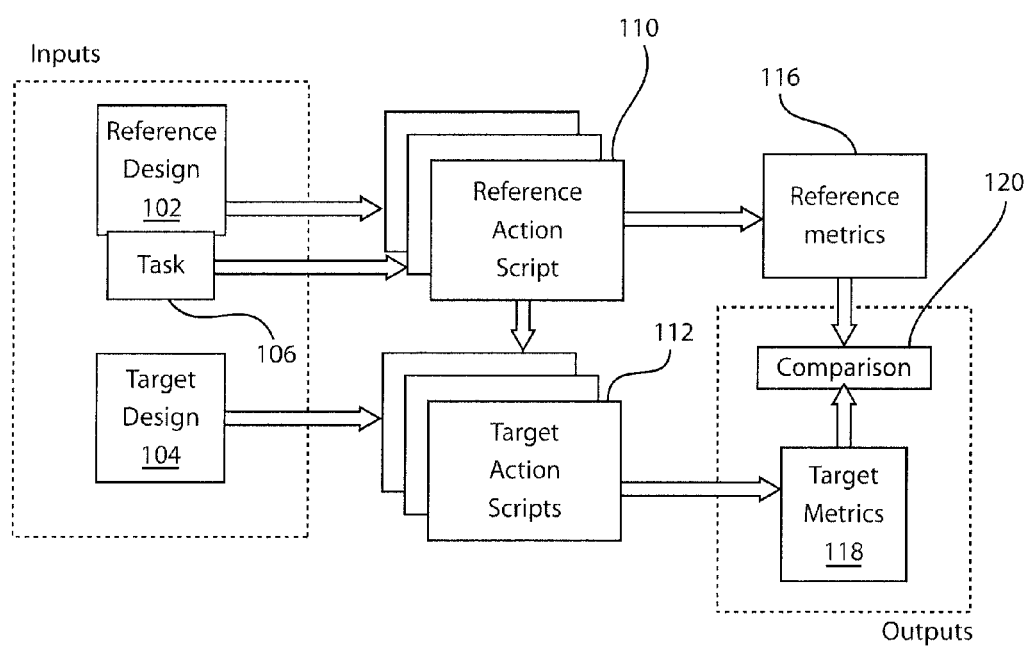
FIG. 1 is a block/flow diagram showing a system/method for task-based evaluation of user interfaces in accordance with one embodiment.

In accordance with the present principles, systems and methods provide ways to assess the usability of a design for a particular task in an alternate user interface, given a reference design, an alternate (target) design, and a description of a task in the reference design. This task description may be acquired through an explicit demonstration, from commonly used paths through an implemented system, or a formal description.

In one embodiment, a system/method first generates an action script for the task in the reference design. This 'reference script' represents the actions that would be taken by an expert user to perform the task on the reference design, such as clicking on a button or typing text into an entry field. The system/method translates the reference script into an equivalent script for achieving a same task in the target design. This 'target script' may be quite different from the original, with different actions and numbers of steps. The script may be calculated to represent the most efficient method for achieving the task, a method that would be commonly used, or a method tailored to a specific user's preferred style of operation. The target script is then run against the target design, using cognitive models of human performance to produce target metrics describing how an expert would perform this task in the manner dictated by the script. The method may also run the reference script on the reference design using the same cognitive models, to produce reference metrics.

The method outputs the target script, the target metrics, and a comparison of the target metrics with the reference metrics.

Metrics can include the time needed to do the task, the number of steps in the task, the difficulty of the task sequence, etc. This enables the designer to work at a concrete level and identify usability problems with alternate user interfaces based on a task specified against their preferred concrete design.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a block/flow diagram shows a system/method 100 for implementing a task-based evaluation of a user interface in accordance with an illustrative embodiment. Given a reference design 102, which includes a user interface design for an application, and a target design 104, an alternative user interface design, for an identical or related application, the system/method will use a task 106 or tasks specified in relation to the reference design 102 to produce tasks and evaluation metrics for the target design.

The reference design 102 is a user interface design that the designer is working with, and applies tasks to. The target design 104 is an alternative user interface for the same application, e.g., a screen reader version, a mobile device version, etc. The task 106 is a set of steps that users will follow to achieve some goal with a particular user interface design, e.g., enter text into a form field, click on a link, etc. An action script (110, 112) is a more detailed description of the specific actions a user will take with a specific user interface to achieve a task, e.g., move hand to mouse, click the mouse button, type a single character. The action script provides for the reference design 102 and for the target design 104 to create a reference action script 110 and a target action script 112, respectively. Likewise, metrics are generated for both the target and the reference to provide reference metrics 116 and target metrics 118, respectively. A metric is a measure relating to usability of a specific task in a specific design, e.g., task time, etc. A step as referred to herein is a single user action in a script or task, such as, e.g., pressing a key or moving the mouse.

In block 120, a comparison between the reference metrics 116 and the target metrics 118 is made to determine whether the reference design 102 is equivalent to the target design 104, for the task 106. This comparison may be in terms of performance (e.g., comparable times) or achieving a particular goal (e.g., information found, web page logged into, etc.).

To illustrate the present principles, a non-limiting example is presented. The reference design 102 in this example represents a web-based shopping application. The reference design 102 includes a set of user interface states having interactive widgets. The states represented in the design 102 are connected by transitions representing actions a user can take to move from one state to another. The target design 104 in this example is an auditory version of the same application, representing how the application would be presented to a blind individual using screen reading software to read the elements of the visual design. The target design 104 is structured very differently from the reference design 102, and the available transitions between the states are also different.

One or more common shopping tasks are specified, based on the widgets and transitions available in the reference design 102. The system/method 100 produces one or more methods for performing the same tasks in the target design 104. The system/method 100 provides metrics (116, 118) summarizing those methods (e.g., prediction of task times, etc.) and provides a comparison block 120 of task metrics in the reference design 102 and target design 104.

Figure 2:
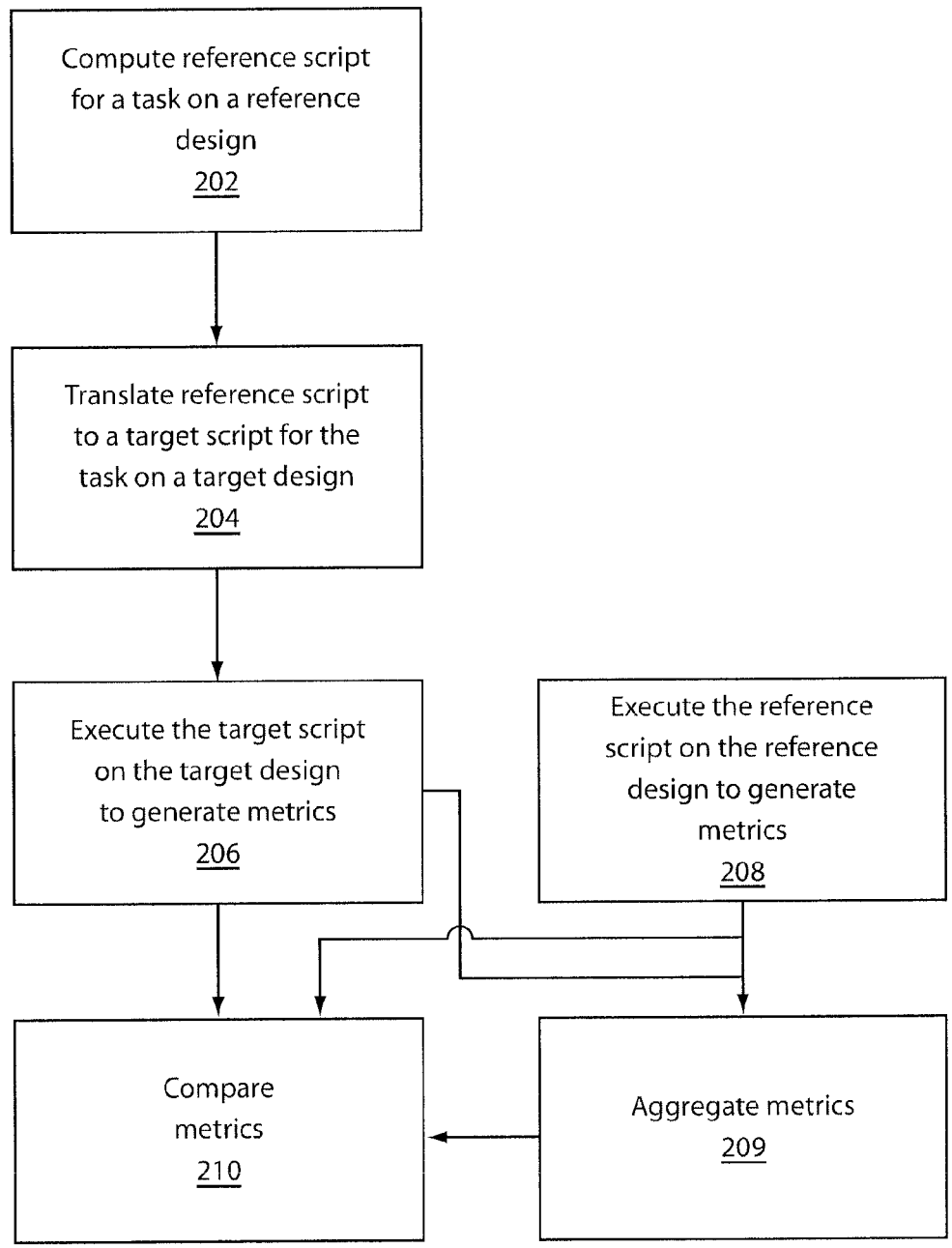
FIG. 2 is a block/flow diagram showing a system/method for task-based evaluation of user interfaces in accordance with one embodiment.

Referring to FIG. 2 with continued reference to FIG. 1, a system/method showing high-level method steps for task-based comparison of user interfaces is illustratively depicted. In block 202, a reference action script 110 is computed for a task 106, based on a reference design 102. The action script may be computed based on an application or even a task specification from a demonstration on the reference design, a task specification from usage data of an implemented design, etc. An example task 106 may include the following steps: 1) Click on 'Edit my profile' button; 2) Type name 'Sue'; 3) Click on 'Address' field; 4) Type address: '123 My Street'; 5) Click on 'Save' button.

In block 204, the reference action script 110 is translated into one or more target action scripts 112, based on a target design 104. The target design 104 may be obtained by translation from the reference design 102 or a prototype. The translation may be applied to more than one target designs 104. In block 206, the target action scripts 112 are run on the target design 104 to produce metrics 118. An example, action script for this task may include: 1) Move hand to mouse; 2) Move mouse to move cursor to location (x=213, y=45); 3) Click right mouse button; 3) Move hand to keyboard; 4) Wait for new page to load; 5) Type 'S'; Type 'u'; Type 'e'.

In one embodiment, metrics 116 for the reference design are computed in block 208 and compared to the metrics 118 in block 210. Alternately, the target metrics 118 may be compared to a standard, threshold or other criteria to determine whether the target metrics achieve a desired response. The scripting and determination of metrics may be applied to more than one task, producing aggregated metrics in block 209. Example metrics may include time needed to do the task, a number of steps in the task, difficulty of the task sequence, task results, etc.

Figure 3:
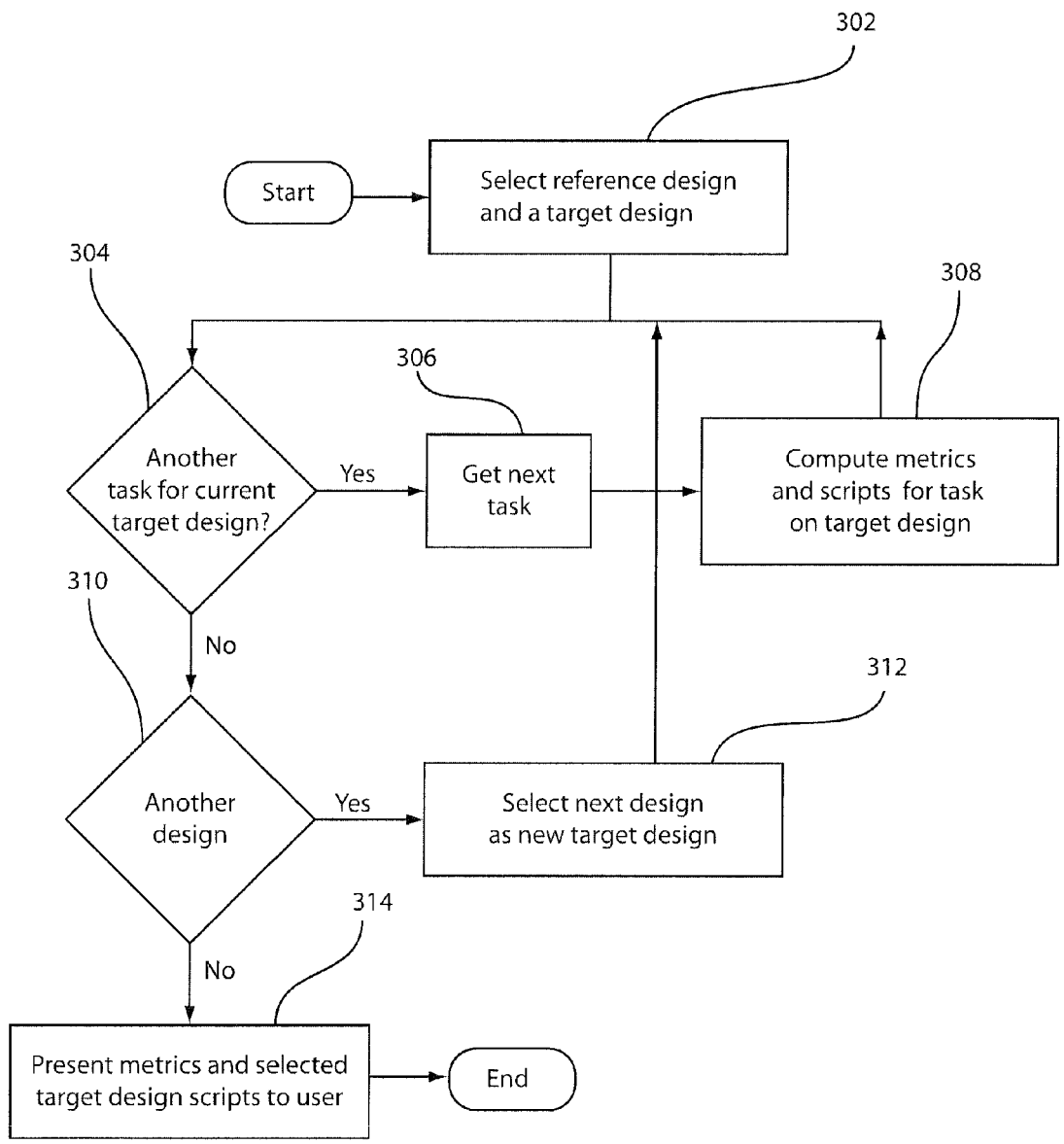
FIG. 3 is a block/flow diagram showing a system/method for obtaining a target design script and metrics in accordance with one embodiment.

Referring to FIG. 3, a high-level task-based system/method to retrieve a target metrics is illustratively shown in accordance with another embodiment. In block 302, a reference design is selected. This may include selecting a single reference design or one of a plurality of reference designs. A target reference may also be selected. In block 304, a determination is made as to whether another task for a current target design is to be reviewed. In a first iteration, this determination is yes as the target design is already selected, and the path continues to block 306. In block 306, the task is selected. In block 308, metrics and scripts are computed for the task on the target design. The path returns to block 304, and repeats until metrics are computed for all tasks associated with the reference design.

When there are no other tasks in block 304, the path continues to block 310 where a determination is made as to whether another target design needs to be considered. If yes, the path continues to block 312 where the next design is selected as the new target design, and the path returns to block 304. If no, in block 310, the path continues to block 314 where, metrics and selected target designs scripts are presented to a user and the program terminates.

Figure 4:
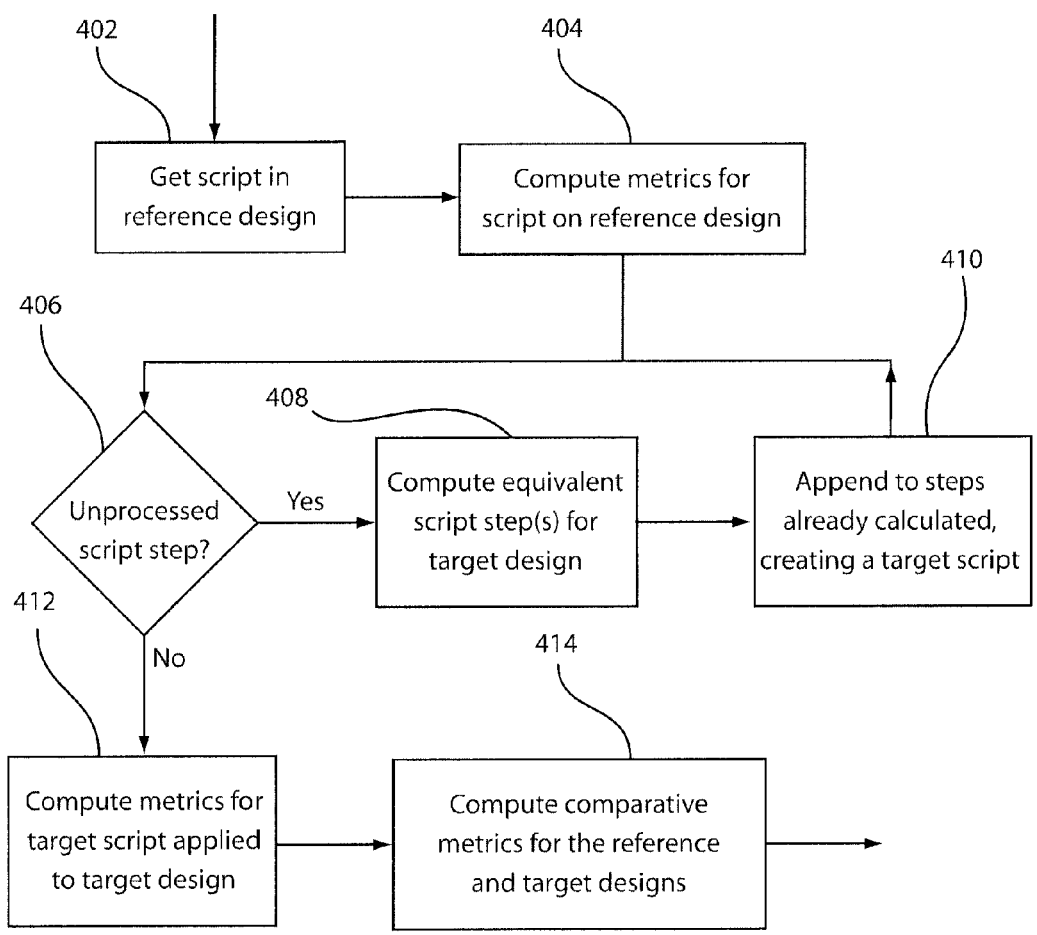
FIG. 4 is a block/flow diagram showing a system/method for executing a script and computing metrics for a task on a target design in accordance with one embodiment.

Referring to FIG. 4, greater details for block 308 to compute a script and metrics for a task on the target design are shown in accordance with one embodiment. In block 402, the script of the reference design is retrieved. In block 404, metrics for the script on the reference design are computed. In block 406, a determination as to whether there remains an unprocessed script step is made. If yes, then a calculation of equivalent scripts steps for the target design is made for the unprocessed script step in block 408. Steps already calculated are appended to the target script to create the target script. When no unprocessed script steps remain, the path continues to block 412 where metrics for the target script are computed as applied to the target design. In block 414, comparative metrics and measurements are made between the reference and target scripts. Processing of block 308 continues in FIG. 3.

Figure 5:
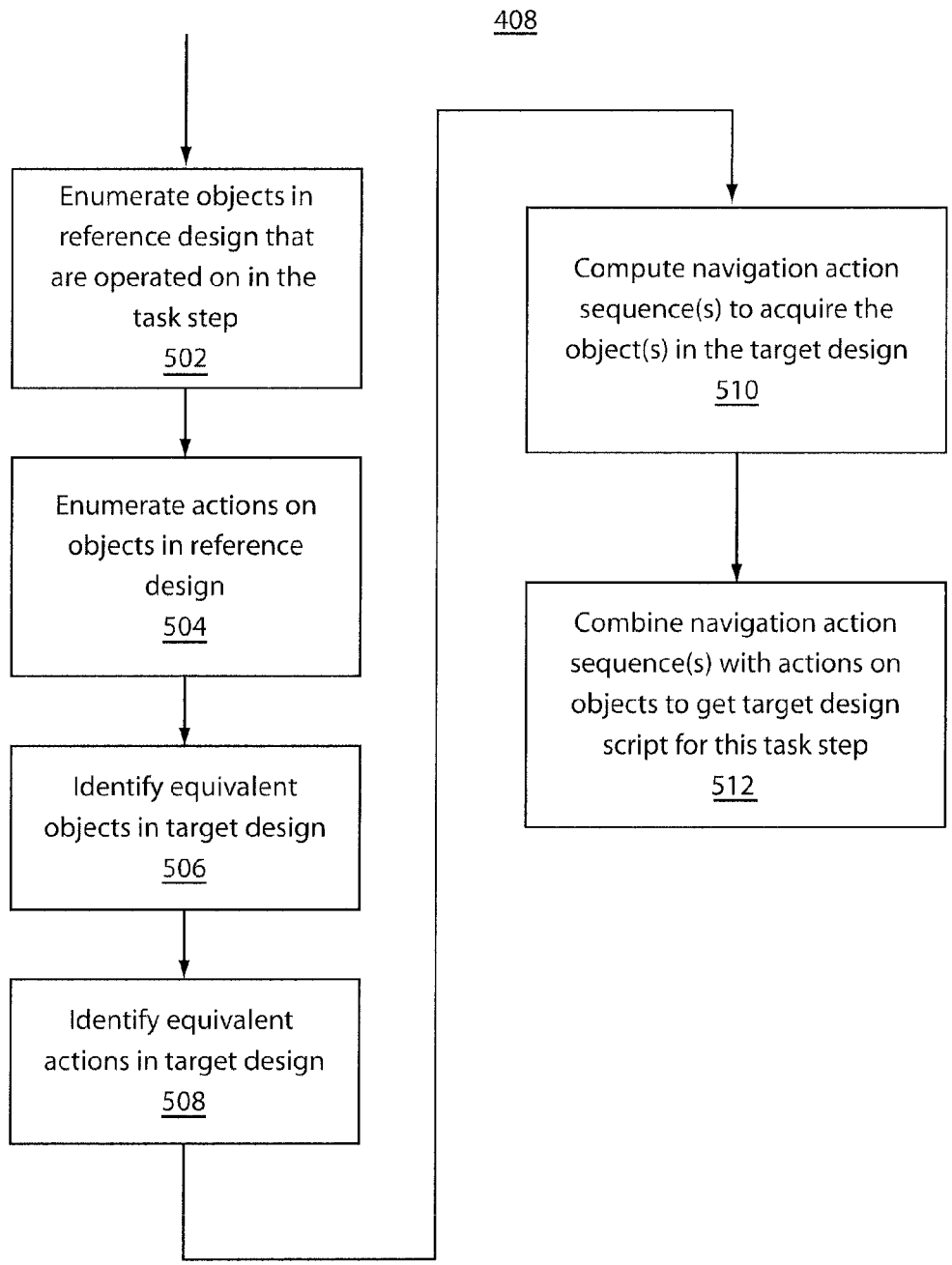
FIG. 5 is a block/flow diagram showing a system/method for executing a target script step or steps for one reference script step in accordance with one embodiment.

Referring to FIG. 5, processing of block 408 is shown in greater detail to compute target script steps for one reference script step. In block 502, objects in the reference design that are operated on in the task step are enumerated. In block 504, actions on objects in the reference design are enumerated. In block 506, equivalent objects in the target design are identified. In block 508, equivalent actions in the target design are identified. In block 510, navigation action sequences are computed to acquire the object(s) in the target design. In block 512, navigation action sequences are combined with actions on objects to get the target design script for the current task step. Processing of block 408 continues in FIG. 4.

Figure 6:
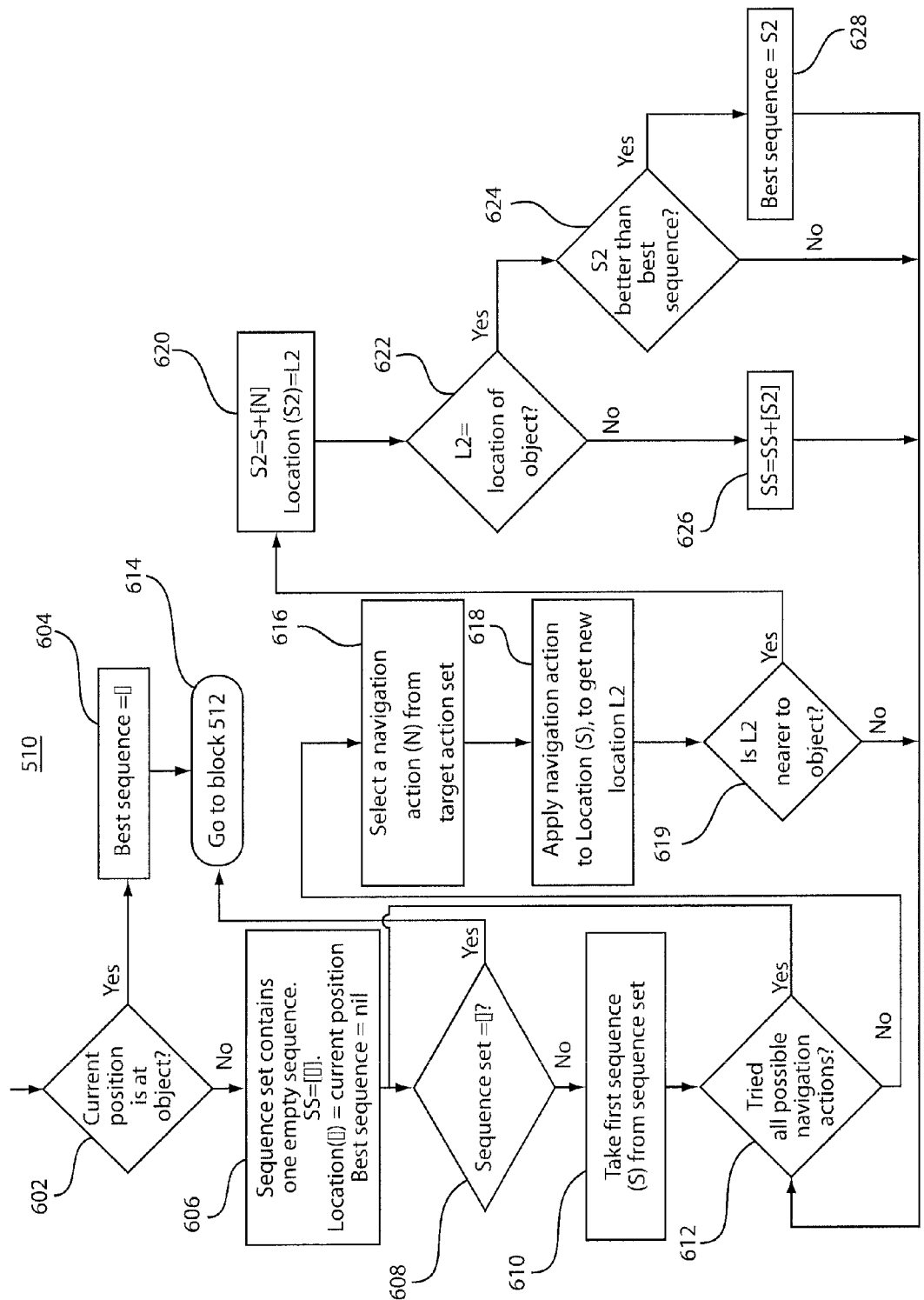
FIG. 6 is a block/flow diagram showing a system/method for finding a best sequence of navigation actions to move from a current position to a position of an object in accordance with one embodiment.

Referring to FIG. 6, block 510 is shown in greater detail for finding a best sequence of navigation actions to move from a current position to a position of an object. In block 602, a determination is made as to whether a current position is at the desired object. If yes, the best sequence is an empty sequence (denoted as □), as no navigation is required to reach the object, in block 604. The path can continue in block 512 of FIG. 5. If not on the desired object in block 602, then in block 606, a sequence set includes one empty sequence, SS=[□]. Location (□)=current position, and best sequence=nil.

In block 608, a determination of whether a sequence set is empty (equals □) is made. If there are no sequences in the sequence set (sequence set=□), then the path can continue in block 512 of FIG. 5. If the sequence set contains one or more sequences (does not equal □), then in block 610, take a first sequence (S) from the sequence set. In block 612, a determination is made as to whether all possible navigation actions have been tried. If they have all been tried, the path returns to block 608. If not, a navigation action (N) is selected from a target action set in block 616. In block 618, the navigation action is applied to Location (S) to get to a new location L2. Location(S) is the location within the design resulting from the execution of the navigation steps in the sequence set S.

In block 619, a determination is made as to whether L2 is closer to the desired object. If it is no closer, the path returns to block 612. If it is closer, then the navigation action is added to the sequence (S2=S+[N]) and the location reached by that sequence is L2 (Location(S2)=L2) in block 620. In block 622, a determination is made as to whether L2=the location of the desired object. If it is not the location of the desired object, then S2 is added to the sequence set (SS=SS+[S2]) in block 626, and the path returns to block 612. If it is the location of the desired object, then a determination as to whether S2 is better than the best sequence is made in block 624. If it is not better, the path returns to block 612 and a different navigation action will be tried. If it is better, then Best sequence=S2 in block 628, and the path returns to block 612. When the best sequence of navigation actions is found from all possible navigation actions, the path returns to FIG. 5 and continues with block 512.

Figure 7:
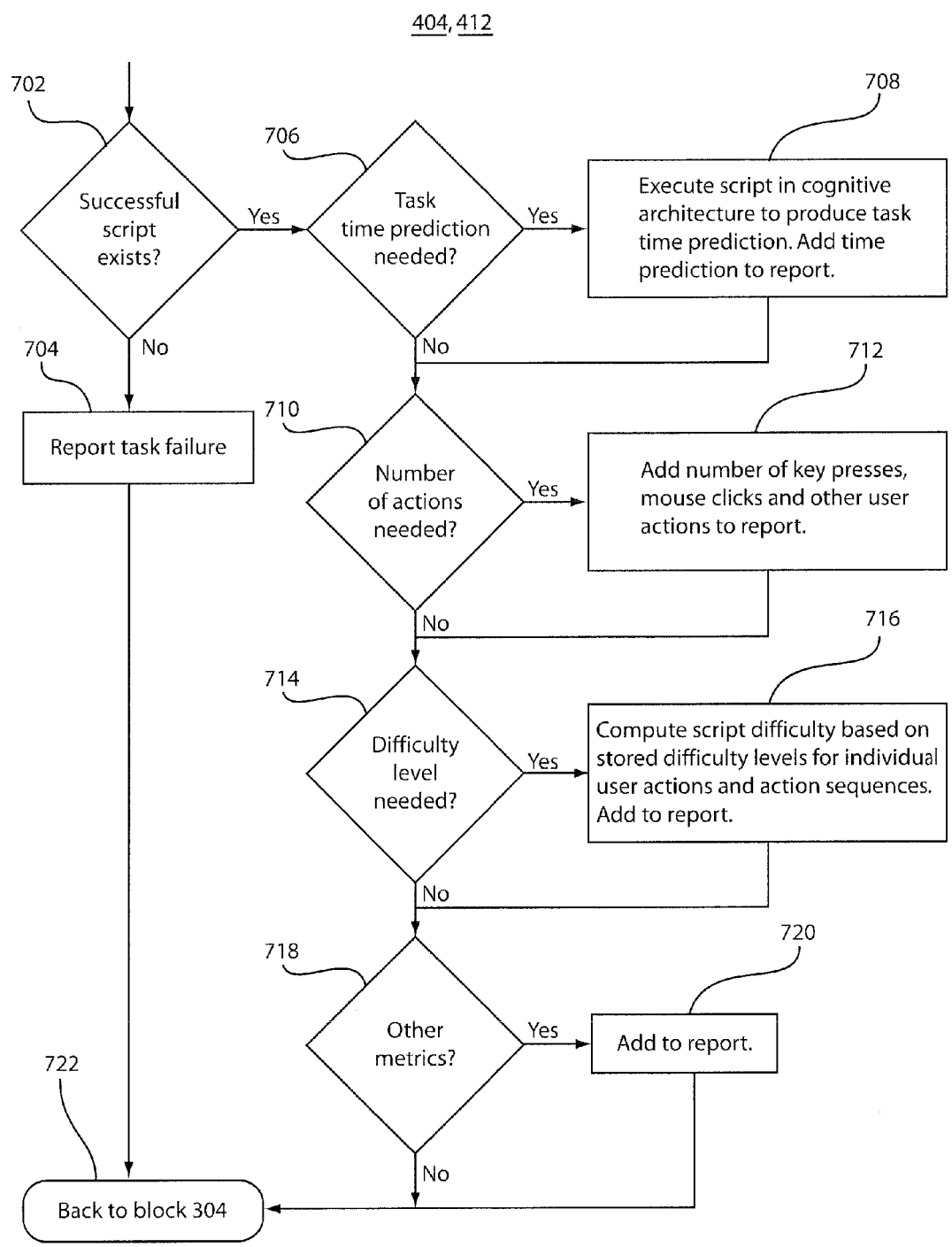
FIG. 7 is a block/flow diagram showing a system/method for computing metrics for a script on a design in accordance with one embodiment.

Referring to FIG. 7, block 404 and/or block 412 of FIG. 4 are shown in greater detail to compute metrics for a script on a design. In block 702, a determination is made as to whether a successful script exists. If no script achieves that task in the design, a task failure is reported in block 704. If a successful script exists, in block 706, a determination is made as to whether a task time prediction is needed. If yes, the script is executed in a cognitive architecture to produce a task time prediction, and the time prediction is added to a prediction report (metric report) in block 708. In block 710, a determination is made as to whether a number of actions is needed. If yes, in block 712, a number of key presses, mouse clicks and other user actions are reported.

In block 714, a determination is made as to whether a difficulty level is needed. If yes, in block 716, script difficulty is computed based on stored difficulty levels for individual action and action sequences. The level is reported. In block 718, a determination is made as to whether other metrics are needed. If yes, in block 720, these metrics are reported. In block 722, the path continues to block 406.

Figure 8:
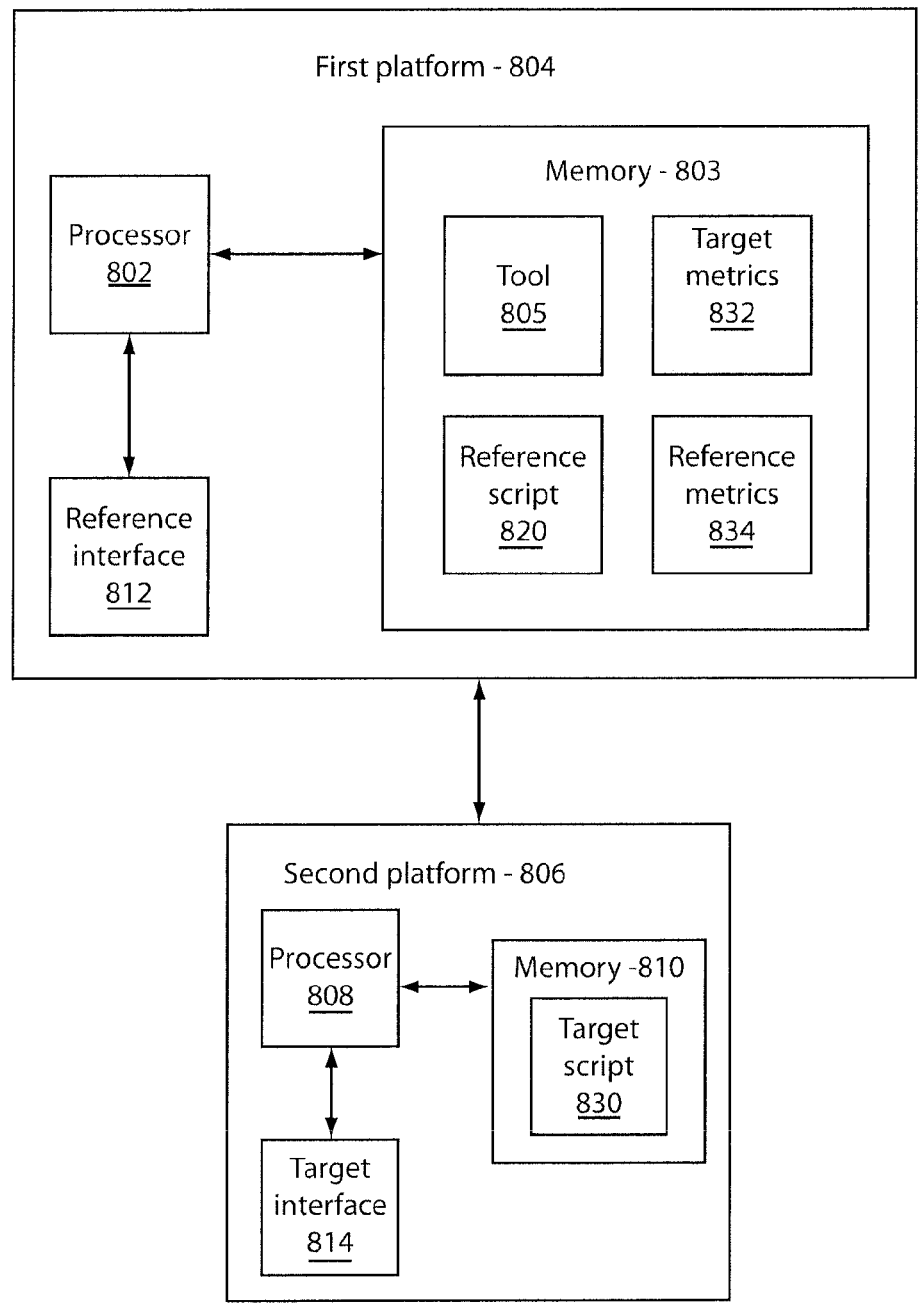
FIG. 8 is a block/flow diagram showing a system for task-based interface evaluation in accordance with one embodiment.

Referring to FIG. 8, a system 800 for evaluating interfaces is illustratively shown. System 800 includes one or more processors 802. System 800 includes a memory coupled to the processor 802. The memory 803 includes an interface evaluation tool 805 configured to determine whether a reference design on a first platform 804, such as a computer, a telephone, a software application, etc. has an equivalent target design on a second platform 806 such that the target design can perform a same or similar task as the reference design. The first and second platforms 804, 806 need to be in communication such that the first platform 804 can access the second platform 806 to determine whether a target script of the second platform is equivalent or nearly equivalent to the first platform. Communication may be over a network, wireless connection, wired connection or any other known connection type or channel to enable communication. Alternately, the two platforms may be resident on a same device (e.g., 804), and the evaluation of interface may be performed on the one device. The first and second platforms 804, 806 may be the same or different types of hardware or software. The second platform 806 may include its own processor 808 and memory 810. The first and second platforms 804 and 806 include one or more interfaces 812 and 814. These interfaces 812 and 814 may include input/output devices, such as mouses, keyboards, and other mechanisms for interacting with the platforms 804 and 806.

It should be understood that the tool 805 may be stored in a distributed memory or in memory of one or both of platforms 804 and 806. The tool 805 is configured to compute a reference script 820 for a task from a reference interface design 812. The reference script 820 is translated into one or more target action scripts 830 based on a target design 814. The target script 830 may be included and executed on the first platform 804 or run on the second platform 806. The tool 805 executes the target action scripts 830 on the target design to produce target metrics 832. The target metrics 832 are used to determine whether the target action script successfully translates the reference script 820. The target metrics are compared to reference design metrics 834 (if desired) or with criteria to determine if a goal is achieved for the target design. The reference script 820 may be employed to generate metrics 834 as well. These metrics 832 and 834 may be compared.

The reference script 820 and the target script 830 for the task include user actions associated with performing the task in the reference design and target design, respectively. The reference script 820 is translated to the target action script 830 by finding a best sequence of navigation actions from a first position to a position of an object. The metrics may include at least one of time prediction metrics, numbers of actions, and script difficulty levels. Other metrics may also be employed.

By providing a comparison between applications on different platforms, the present embodiments identify how interfaces may be made compatible to provide a same interface experience for a user despite being employed in a different environment, on a different device type or in different software. The present principles may generate a metrics report so that continued programming may be performed or may simply identify equivalent steps that can be performed between a reference design and a target design. The present principles may be employed by end-users or by programmers.

Having described preferred embodiments of a system and method for task-based evaluation of alternative user interfaces (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. A method for evaluating interfaces, comprising:
computing a reference script for a task from a reference interface design;

translating the reference script into one or more target action scripts based on a target interface design, comprising;
 indentifying equivalent objects and actions of the reference interface design in the target interface design;
 computing navigation actions to acquire objects in the target interface design; and
 computing navigation actions to acquire objects in the target interface design; and
 combining navigation action sequences with the navigation actions on the objects to get the target action script for the task;
executing the one or more target action scripts on the target design to produce target metrics; and
comparing the target metrics to determine whether the target action script successfully translates the reference script.

2. The method as recited in claim 1, wherein computing a reference script for a task from a reference interface design includes computing user actions associated with performing the task in the reference design.

3. The method as recited in claim 1, wherein translating the reference script into one or more target action scripts based on a target design includes finding a best sequence of navigation actions from a first position to a position of an object.

4. The method as recited in claim 1, wherein executing the one or more target action scripts on the target design to produce target metrics includes computing at least one of time prediction metrics, numbers of actions, and script difficulty levels.

5. The method as recited in claim 1, wherein comparing the target metrics to determine whether the target action script successfully translates the reference script includes comparing reference design metrics and comparing the reference design interface design metrics to the target design metrics.

6. The method as recited in claim 1, wherein comparing the target metrics to determine whether the target action script successfully translates the reference script includes comparing the target design metrics with criteria to determine if a goal is achieved for the target design.

7. The method as recited in claim 1, wherein the reference interface design includes a first device type and the target design includes a different device type than the first device.

8. The method as recited in claim 1, wherein the reference and target action scripts include user actions needed to perform the task.

9. A computer readable storage medium comprising a computer readable program for evaluating interfaces, wherein the computer readable program when executed on a computer causes the computer to perform the steps of:
 computing a reference script for a task from a reference interface design;
 translating the reference script into one or more target action scripts based on a target interface design, comprising:
  identifying equivalent objects and actions of the reference interface design in the target interface design;
  computing navigation actions to acquire objects in the target interface design; and
  combining navigation actions to acquire objects in the target interface design; and
  combining navigation action sequences with the navigation actions on the objects to get the target action script for the task;
 executing the one or more target action scripts on the target design to produce target metrics; and
 comparing the target metrics to determine whether the target action script successfully translates the reference script.

10. The computer readable storage medium as recited in claim 9, wherein computing a reference script for a task from a reference interface design includes computing user actions associated with performing the task in the reference design.

11. The computer readable storage medium as recited in claim 9, wherein translating the reference script into one or more target action scripts based on a target interface design includes finding a best sequence of navigation actions from a first position to a position of an object.

12. The computer readable storage medium as recited in claim 9, wherein executing the one or more target action scripts on the target design to produce target metrics includes computing at least one of time prediction metrics, numbers of actions, and script difficulty levels.

13. The computer readable storage medium as recited in claim 9, wherein comparing the target metrics to determine whether the target action script successfully translates the reference script includes comparing reference design metrics and comparing the reference interface design metrics to the target design metrics.

14. The computer readable storage medium as recited in claim 9, wherein comparing the target metrics to determine whether the target action script successfully translates the reference script includes comparing the target interface design metrics with criteria to determine if a goal is achieved for the target design.

15. The computer readable storage medium as recited in claim 9, wherein the reference interface design includes a first device type and the target interface design includes a different device type than the first device.

16. The computer readable storage medium as recited in claim 9, wherein the reference and target action scripts include user actions needed to perform the task.

17. A system for evaluating interfaces, comprising:
 a processor;
 a memory coupled to the processor, the memory includes an interface evaluation tool configured to determine whether a reference interface design on a first platform has an equivalent target interface design on a second platform such that the target design can perform a same task as the reference design, the tool configured to:
  compute a reference script for a task from a reference interface design;
  translate the reference script into one or more target action scripts based on a target interface design, by:
   identifying equivalent objects and actions of the reference interface design in the target interface design;
   computing navigation actions to acquire objects in the target interface design; and
   combining navigation action sequences with the navigation actions on the objects to get the target actions script for the task;
  execute the one or more target action scripts on the target design to produce target metrics; and
  compare the target metrics to determine whether the target action script successfully translates the reference script.

18. The system as recited in claim 17, wherein the reference script and the target script for the task include user actions associated with performing the task in the reference interface design and target design, respectively.

19. The system as recited in claim 17, wherein the reference script is translated to the target action script by finding a best sequence of navigation actions from a first position to a position of an object.

20. The system as recited in claim 17, wherein the target metrics include at least one of time prediction metrics, numbers of actions, and script difficulty levels.

21. The system as recited in claim 17, wherein the target metrics are compared to reference interface design metrics or with criteria to determine if a goal is achieved for the target design.

22. The system as recited in claim 17, wherein the first platform includes one of a computing device and a software application and the second platform includes a different computing device or software application than the first platform.

23. The system as recited in claim 17, wherein the reference and target action scripts include user actions needed to perform the task.

* * * * *